US012711059B2

(12) United States Patent
Wang et al.

(10) Patent No.: US 12,711,059 B2
(45) Date of Patent: Aug. 18, 2026

(54) IN-NAND LLR GENERATION

(71) Applicant: SK hynix Inc., Gyeonggi-do (KR)

(72) Inventors: Haobo Wang, San Jose, CA (US); Fan Zhang, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/661,307

(22) Filed: May 10, 2024

(65) Prior Publication Data

US 2025/0348426 A1 Nov. 13, 2025

(51) Int. Cl.
*G06F 12/02* (2006.01)

(52) U.S. Cl.
CPC ................................ *G06F 12/0246* (2013.01)

(58) Field of Classification Search
CPC ............... H03M 13/3927; G06F 11/10; G06F 11/1012; G06F 12/0246; G11C 11/5642
See application file for complete search history.

(56) References Cited

U.S. PATENT DOCUMENTS 10,263,644 B1 * 4/2019 Mazahreh .......... H03M 13/1111
10,908,996 B2 2/2021 Motwani
11,024,391 B1 6/2021 Steiner et al.
11,483,014 B2 * 10/2022 Kim .................... G11C 29/028
2011/0225350 A1 * 9/2011 Burger, Jr. ......... G11C 16/0483 711/E12.008
2013/0176778 A1 * 7/2013 Chen ...................... G11C 16/06 365/185.03
2013/0185599 A1 * 7/2013 Alhussien ........... G06F 11/1048 714/42
2018/0076832 A1 * 3/2018 Haga ................... G11C 11/5642
2018/0151222 A1 * 5/2018 Barndt ............... H03M 13/1105
2019/0215019 A1 * 7/2019 Haga ...................... G11C 29/52
2019/0379399 A1 * 12/2019 Varanasi ............ H03M 13/1108
2020/0043557 A1 * 2/2020 Cai ...................... G06F 13/1668
2021/0264986 A1 * 8/2021 Kim ..................... G11C 29/021
2022/0200633 A1 * 6/2022 Kim ..................... G11C 29/028

* cited by examiner

*Primary Examiner* — Tasnima Matin
(74) *Attorney, Agent, or Firm* — IP&T GROUP LLP

(57) ABSTRACT

A memory system and a method for generation of log likelihood ratio LLR values. The system has a storage medium having therein a processor, and a memory controller of the memory system configured to send a soft read command to the storage medium. The processor in the storage medium, in response to the soft read command, is configured to read pages of data stored in the storage medium and generate within the storage medium the LLR values.

20 Claims, 8 Drawing Sheets

H =

| | $V_1$ | $V_2$ | $V_3$ | $V_4$ | $V_5$ | $V_6$ | $V_7$ | $V_8$ |
|---|---|---|---|---|---|---|---|---|
| $C_1$ | 1 | 1 | 1 | 0 | 0 | 0 | 0 | 0 |
| $C_2$ | 1 | 1 | 1 | 1 | 1 | 0 | 0 | 0 |
| $C_3$ | 0 | 0 | 0 | 1 | 1 | 1 | 1 | 0 |
| $C_4$ | 0 | 0 | 1 | 1 | 1 | 1 | 1 | 1 |

IN-NAND LLR GENERATION

BACKGROUND

1. Field

The present invention relates to log likelihood ratio generation for decoders.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices. Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

In this context, embodiments of the present invention arise.

SUMMARY

In accordance with one embodiment of the invention, there is provided a memory system for generation of log likelihood ratio LLR values. The system has a storage medium having therein a processor, and a memory controller of the memory system configured to send a soft read command to the storage medium. The processor in the storage medium, in response to the soft read command, is configured to read pages of data stored in the storage medium and generate within the storage medium the LLR values.

In accordance with another embodiment of the invention, there is provided a method for generation of log likelihood ratio LLR values. The method sends a soft read command from a memory controller of a memory system to the storage medium. In response to the soft read command, the method reads pages of data stored in the storage medium by a processor in the storage medium, and the method generates within the storage medium the LLR values.

DETAILED DESCRIPTION

Figure 1:
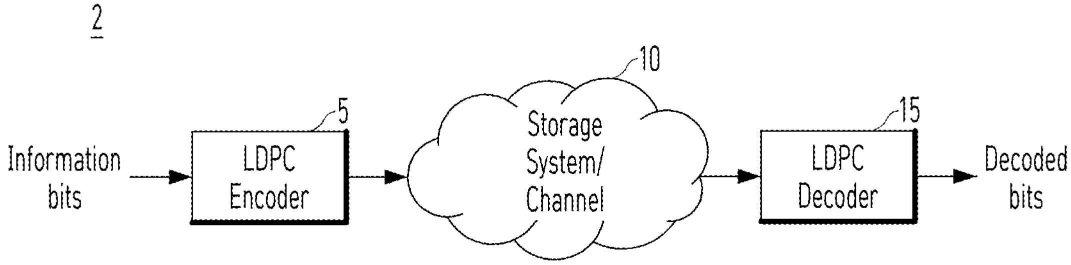
FIG. 1 is a high level block diagram illustrating an error correcting system in accordance with embodiments of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention encompasses numerous alternatives, modifications and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

FIG. 1 is a high-level block diagram illustrating an error correcting system 2, in accordance with embodiments of the present invention. More specifically, the high-level block diagram in FIG. 1 shows error correcting system 2 including an encoder 5 and a decoder 15 using for example LDPC coding and decoding algorithms. That is, error correcting system 2 may include a LDPC encoder 5 and a LDPC decoder 15, although other coding and decoding algorithms can be used.

Figure 2:
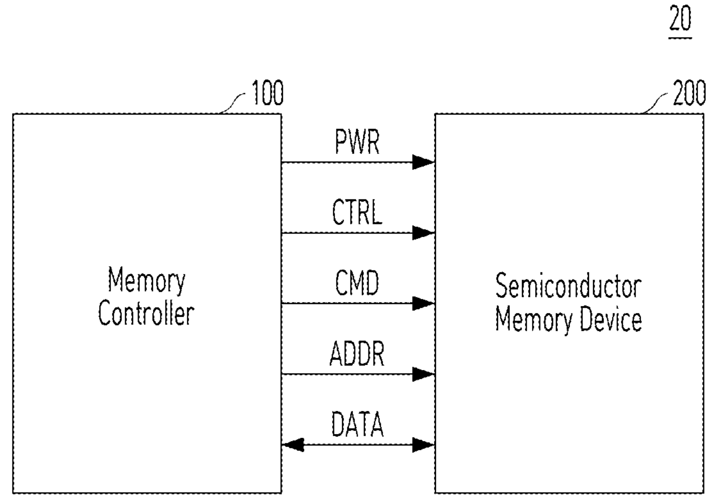
FIG. 2 is a block diagram schematically illustrating a memory system in accordance with embodiments of the present invention.

The LDPC encoder 5 may receive information bits including data which is desired to be stored in a storage system 10 (such as in memory system 20 of FIG. 2). The LDPC encoder 5 may encode the information bits to output LDPC encoded data. The LDPC encoded data from the LDPC encoder 5 may be written to a storage device or memory device of the storage system 10. In various embodiments, the storage device may include a variety of storage types or media. In some embodiments, during being written to or read from the storage device, data is transmitted and received over a wired and/or wireless channel. In this case, the errors in the received codeword may be introduced during transmission of the codeword.

When the stored data in the storage system 10 is requested or otherwise desired (e.g., by an application or user which stored the data), the LDPC decoder 15 may perform LDPC decoding data received from the storage system 10, which may include some noise or errors. In various embodiments, the LDPC decoder 15 may perform LDPC decoding using the decision and/or reliability information for the received data. The decoded bits generated by the LDPC decoder 15 are transmitted to the appropriate entity (e.g., the user or application which requested it). With proper encoding and decoding, the information bits match the decoded bits.

FIG. 2 is a block diagram schematically illustrating a memory system 20 in accordance with one embodiment of the present invention.

Referring FIG. 2, the memory system 20 may include a memory controller 100 and a semiconductor memory device 200.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal may include a command latch enable (CLE) signal, an address latch enable (ALE) signal, a chip enable (CE) signal, a write enable (WE) signal, a read enable (RE) signal, and so on.

The memory controller 100 and the semiconductor memory device 200 may be integrated in a single semiconductor device. For example, the memory controller 100 and the semiconductor memory device 200 may be integrated in a single semiconductor device such as a solid state drive (SSD). The solid state drive may include a storage device for storing data therein. When the semiconductor memory system 20 is used in an SSD, operation speed of a host (not shown) coupled to the memory system 20 may remarkably improve.

The memory controller 100 and the semiconductor memory device 200 may be integrated in a single semiconductor device such as a memory card. For example, the memory controller 100 and the semiconductor memory device 200 may be integrated in a single semiconductor device to configure a memory card such as a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and a universal flash storage (UFS).

For another example, the memory system 20 may be provided as one of various elements including an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, one of electronic devices of a home network, one of electronic devices of a computer network, one of electronic devices of a telematics network, a radio-frequency identification (RFID) device, or elements devices of a computing system.

Figure 3:
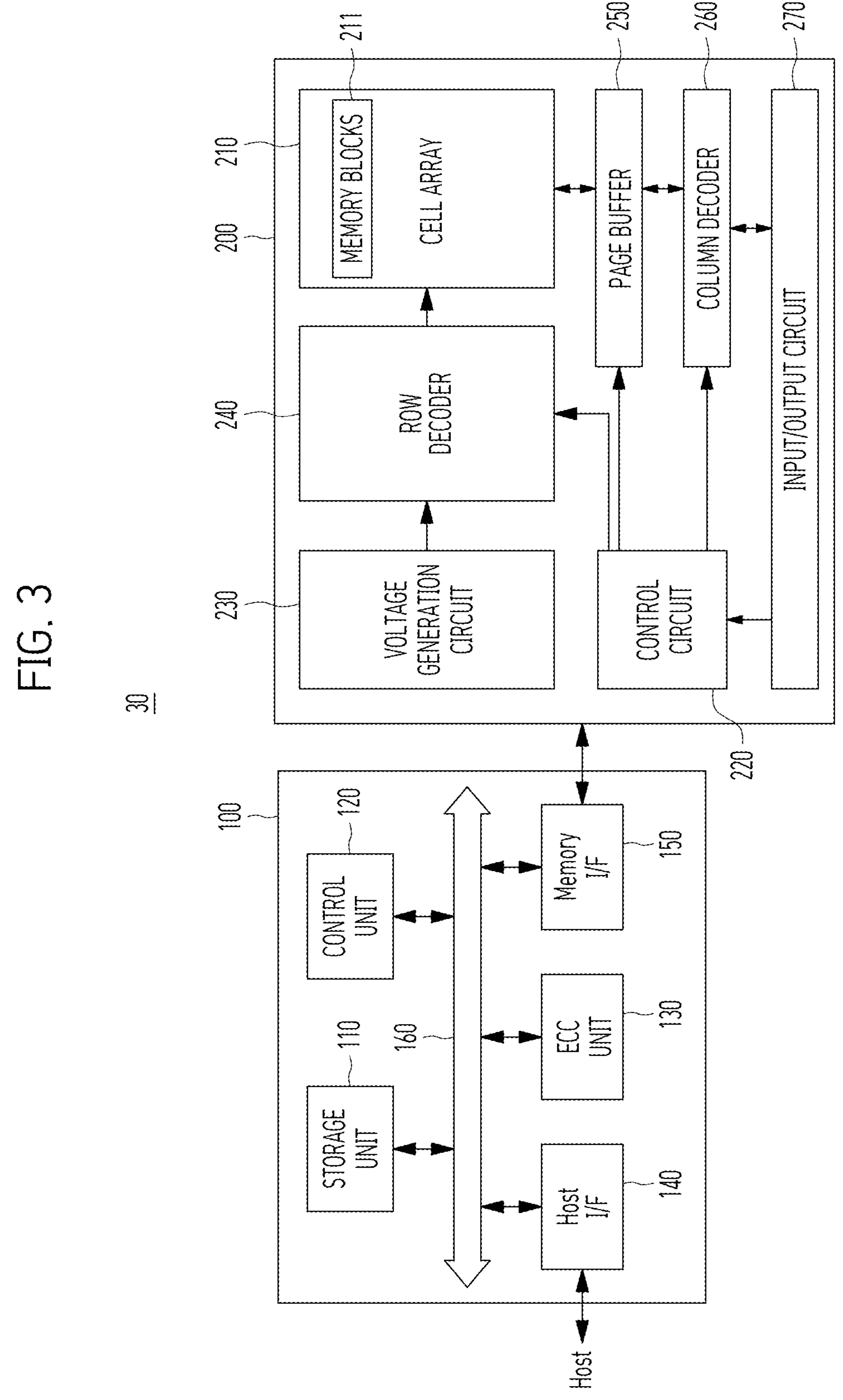
FIG. 3 is a block diagram illustrating a memory system in accordance with embodiments of the present invention.

FIG. 3 is a detailed block diagram illustrating various embodiments of memory system 30 in accordance with one embodiment of the present invention. For example, memory system 30 of FIG. 3 may depict the storage system 10 shown in FIG. 1 or the memory system 20 shown in FIG. 2.

Referring to FIG. 3, the memory system 30 may include the memory controller 100 and the semiconductor memory device 200. The memory system 30 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, a digital video recorder and a digital video player. In some embodiments, the host device may include a portable electronic device such as a mobile phone, a smart phone, an e-book, an MP3 player, a portable multimedia player (PMP), and a portable game player. The memory device 200 may store data to be accessed by the host device.

The memory device 200 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The controller 100 may control storage of data in the memory device 200. For example, the controller 100 may control the memory device 200 in response to a request from the host. The controller 100 may provide the data read from the memory device 200, to the host, and store the data provided from the host into the memory device 200.

The controller 100 may include a storage unit 110, a control unit 120, the error correction code (ECC) unit 130, a host interface 140 and a memory interface 150, which are coupled through a bus 160.

The storage unit 110 may serve as a working memory of the memory system 10 and the controller 100, and store data for driving the memory system 10 and the controller 100.

When the controller 100 controls operations of the memory device 200, the storage unit 110 may store data used by the controller 100 and the memory device 200 for such operations as read, write, program and erase operations.

The storage unit 110 may be implemented with a volatile memory. The storage unit 110 may be implemented with a static random access memory (SRAM) or a dynamic random access memory (DRAM). As described above, the storage unit 110 may store data used by the host device in the memory device 200 for the read and write operations. To store the data, the storage unit 110 may include a program memory, a data memory, a write buffer, a read buffer, a map buffer, and so forth.

Referring to FIG. 3, the control unit 120 may control general operations of the memory system 30, and a write operation or a read operation for the memory device 200, in response to a write request or a read request from the host device. The control unit 120 may drive firmware, which is referred to as a flash translation layer (FTL), to control the general operations of the memory system 10. For example, the FTL may perform operations such as logical to physical (L2P) mapping, wear leveling, garbage collection, and bad block handling. The L2P mapping is known as logical block addressing (LBA).

The ECC unit 130 may detect and correct errors in the data read from the memory device 200 during the read operation. The ECC unit 130 may not correct error bits when the number of the error bits is greater than or equal to a threshold number of correctable error bits, and may output an error correction fail signal indicating failure in correcting the error bits.

In some embodiments, the ECC unit 130 may perform an error correction operation based on a coded modulation such as an LDPC code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and so on. The ECC unit 130 may include all circuits, systems or devices for the error correction operation.

As shown in FIG. 3, host interface 140 may communicate with the host device through one or more of various interface protocols such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, a column decoder 260, and an input/output circuit 270. The memory cell array 210 may include a plurality of memory blocks 211 and may store data therein. The voltage generation circuit 230, the row decoder 240, the page buffer 250, the column decoder 260 and the input/output circuit 270 form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages having various levels. For example, in an erase operation, the voltage generation circuit 230 may generate operation voltages having various levels such as an erase voltage and a pass voltage.

The row decoder 240 may be connected to the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks among the plurality of memory blocks 211.

The page buffer 250 may be connected to the memory cell array 210 through bit lines BL (not shown). The page buffer 250 may precharge the bit lines BL with a positive voltage, transmit/receive data to/from a selected memory block in program and read operations, or temporarily store transmitted data, in response to a page buffer control signal generated by the control circuit 220.

The column decoder 260 may transmit/receive data to/from the page buffer 250 or transmit/receive data to/from the input/output circuit 270.

The input/output circuit 270 may transmit, to the control circuit 220, a command and an address, transmitted from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

Figure 4:
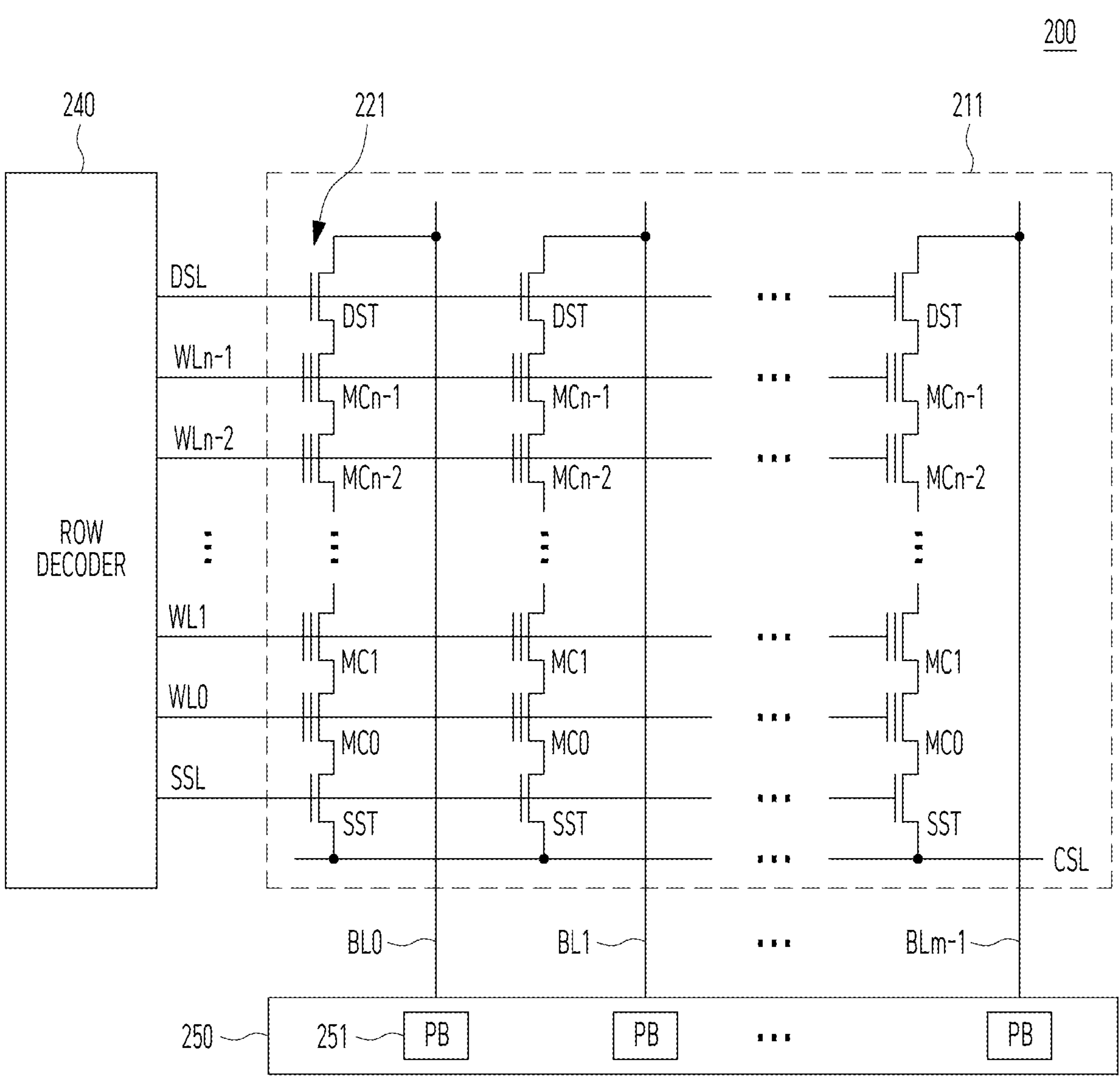
FIG. 4 is a circuit diagram illustrating a memory block of a memory device in accordance with embodiments of the present invention.

FIG. 4 is a circuit diagram illustrating a memory block of a semiconductor memory device in accordance with an embodiment of the present invention. For example, a memory block of FIG. 4 may be the memory blocks 211 of the memory cell array 210 shown in FIG. 3.

Referring to FIG. 4, the memory blocks 211 may include a plurality of cell strings 221 coupled to bit lines BL0 to BLm−1, respectively. The cell string of each column may include one or more drain selection transistors DST and one or more source selection transistors SST. A plurality of memory cells or memory cell transistors may be serially coupled between the selection transistors DST and SST. Each of the memory cells MC0 to MCn−1 may be formed of a multi-level cell (MLC) storing data information of multiple bits in each cell. The cell strings 221 may be electrically coupled to the corresponding bit lines BL0 to BLm−1, respectively.

In some embodiments, the memory blocks 211 may include a NAND-type flash memory cell. However, the memory blocks 211 are not limited to the NAND flash memory, but may include NOR-type flash memory, hybrid flash memory in which two or more types of memory cells are combined, and one-NAND flash memory in which a controller is embedded inside a memory chip.

Figure 5:
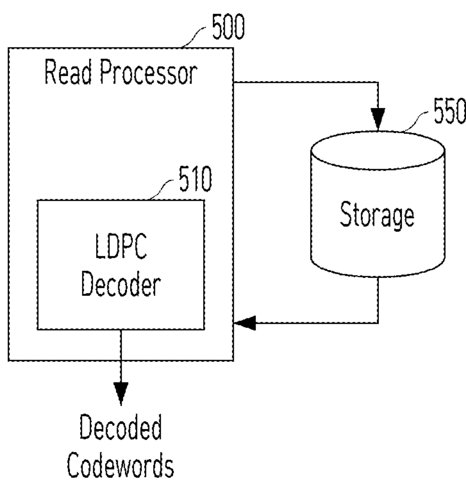
FIG. 5 is a diagram illustrating a storage system in accordance with embodiments of the present invention.

FIG. 5 is a diagram illustrating a storage system in accordance with embodiments of the present invention.

Referring to FIG. 5, the storage system may include a storage 550 and a memory controller such as a read processor 500. The read processor 500 may perform a read operation for data stored in the storage 550. During the read operation, the read processor 500 may read data from the storage 550, which may include some noise or errors, and perform error correction for the read data. In some embodiments, the read processor 500 may include a decoder, for example, the LDPC decoder 510 which may perform LDPC decoding. The read processor 500 may also perform BF decoding and MS decoding. The read processor 500 may include a receiver (not shown) for receiving data from the storage 550.

When the stored data in the storage 550 is requested or otherwise desired (e.g., by an application or user which stored the data), the LDPC decoder 510 may receive data from the storage 550. The received data may include some noise or errors. The LDPC decoder 510 may perform detection on the received data and output decision and/or reliability information. The LDPC decoder 510 may include one of a soft detector and a hard detector. Either the soft detector or the hard detector can provide channel information for decoders, such as the LDPC decoder. For example, the soft detector may output reliability information and a decision for each detected bit. On the other hand, the hard detector may output a hard decision on each bit without providing corresponding reliability information. As an example, the hard detector may output as the hard decision that a particular bit is a “1” or a “0” without indicating how certain or sure the detector is in that decision. In contrast, the soft detector may output a decision and reliability information associated with the decision. In general, reliability information indicates how certain the detector is in a given decision. In one example, a soft detector may output a log-likelihood ratio (LLR) where the sign indicates the decision (e.g., a positive value corresponds to a “1” decision and a negative value corresponds to a “0” decision) and the magnitude indicates how sure or certain the detector is in that decision (e.g., a large magnitude indicates a high reliability or certainty).

Also, LDPC decoder 510 may perform LDPC decoding using the decision and/or reliability information. LDPC decoder 510 may include one of a soft decoder and a hard decoder. The soft decoder utilizes both the decision and the reliability information to decode the codeword. The hard decoder utilizes only the decision values to decode the codeword. The decoded bits generated by the LDPC decoder 510 are transmitted to the appropriate entity (e.g., the user or application which requested it). With proper encoding and decoding, the information bits match the decoded bits.

In various embodiments, the system shown in FIG. 5 may be implemented using a variety of techniques including an application-specific integrated circuit (ASIC), a field-programmable gate array (FPGA), and/or a general purpose processor (e.g., an Advanced RISC Machine (ARM) core).

Figure 6A:
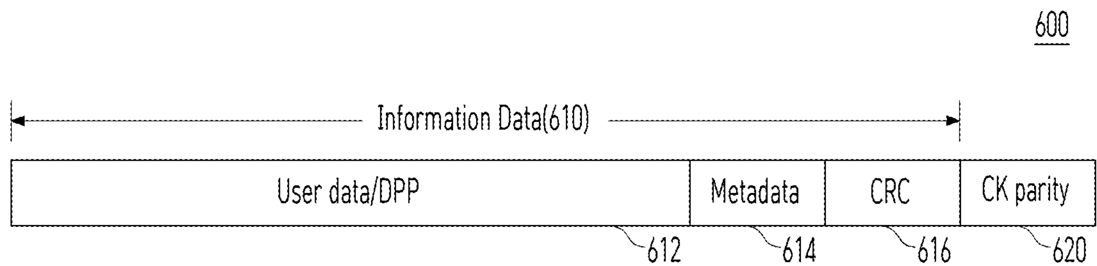
FIG. 6A is a diagram illustrating a format of a codeword to be stored in a storage system in accordance with embodiments of the present invention.

FIG. 6A is a diagram illustrating a format of a codeword 600 to be stored in a storage system. Referring to FIG. 6A, the codeword 600 may include information data 610 and parity 620. In some embodiments, the codeword 600 may be generated by low-density parity-check (LDPC) codes. In other words, the information data 610 may be protected by LDPC codes, and the parity 620 may be LDPC parity. The information data 610 may include user data with data path protection (DPP) 612, meta-data 614 and cyclic redundancy check (CRC) parity bits 616. A CRC code which is an error-detecting code commonly used in digital networks and storage devices may detect accidental changes to raw data.

In a typical LDPC decoder, if the LDPC checksum is zero, the decoder may be terminated. The CRC parity bits 616 will be computed based on the decoded user data 612 and meta-data 614 after the LDPC decoding. If the computed CRC parity bits match the decoded CRC parity bits, decoding may be successful. Otherwise, a mis-correction may be declared.

In some embodiments of the present invention, it is supposed that $x=[x_0, x_1, \ldots, x_{N-1}]$ is a bit vector, and $H=[h_{i,j}]$ is an M×N LDPC matrix with a binary value $h_{i,j}$ at the intersection of row i and column j. Then each row of H provides a parity check for x. If x is a codeword of H, it has $xH^T=0$, where HT is referred to as the syndrome.

LDPC codes may be represented by bipartite graphs. One set of nodes (e.g., the variable or bit nodes) may correspond to elements of the codeword, and the other set of nodes (e.g., check nodes) may correspond to the set of parity check constraints satisfied by the code words.

Figures 6B, 6C:
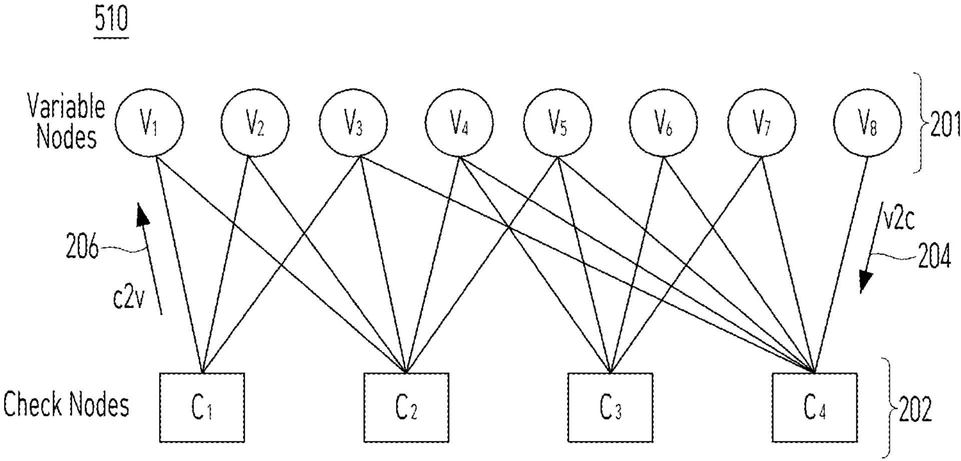
FIGS. 6B and 6C are diagrams of a low-density parity check decoder nodes and a low density parity check H-matrix in accordance with embodiments of the present invention.

FIG. 6B is a diagram of a bipartite graph showing aspects of node communications in LDPC decoder 510. The decoder 510 includes a number of variable nodes 201, which are part of a variable node unit (VNU). A total of eight variable nodes (VNs) 201 are shown in FIG. 6B, labeled as v1-v8. The VNs 200 communicate with a series of check nodes (CNs) 202 that are part of a check node unit (CNU) described in more detail below. A total of four check nodes are shown in FIG. 6B, labeled as c1-c4. Other respective numbers and arrangements of the respective nodes 201, 202 can be provided. The lines connecting the variable nodes 201 to the check nodes represent two-way communications paths for transmitting messages therebetween. These messages may go from variable to check node as indicated by v2c direction 204 or from check to variable node, as indicated by c2v direction 206. In FIG. 6C, the number of “1s” in the corresponding rows and columns of a low density parity check matrix H is shown that represents the interconnections between variable and check nodes in the graph of FIG. 6B. With regard to FIG. 6C, the term “weight” as used herein refers to the number of entries in a row or a column of the H matrix that have the number “1” listed. As seen in FIG. 6C, the first row associated with c1 has a weight of 3, while the second row associated with c2 has a weight of 5. Viewed differently, the weight of a particular check node may also be defined as the degree of connectivity of the variable nodes to the check node, as shown in FIG. 6B, where the weight of c1 would be 3 and the weight of c2 would be 5.

In LDPC decoding, a syndrome update may check to see if all of the errors have been removed from the codeword. For example, if for parity check matrix H (e.g., matrix of FIG. 6C), the LDPC checksum $\hat{c}H=0$, then the syndrome update can determine that decoding is successful and that all errors have been removed from the codeword. If so, the LDPC decoding stops decoding and outputs $\hat{c}=[\hat{c}1, \hat{c}2, \ldots \hat{c}N]$ as the decoded output.

If the LDPC checksum is not equal to zero, the decoded codeword (i.e., $\hat{c}$) is not output and another decoding iteration is performed until a maximum number of iterations, which may be predefined, is reached. In other words, the variable node update calculates new messages V2C messages and new LLR values, the check node update calculates new messages C2V messages, and the codeword update calculates a new codeword and checks if the product of the new codeword and the parity check matrix is 0, that is $\hat{c}H=0$.

In one embodiment of the present invention, there is a system-on-chip (SoC) which includes a soft read LDPC decoder. This decoder (which is often used at a late stage of an error correction operation) provides error correction performance. For this soft read LDPC decoder, the input are log likelihood ratio (LLR) values. Generating or selecting proper LLR values can achieve better error correction performance. LLRs are assigned to various values that are obtained by performing multiple reads on NAND storage. Usually, the results of the reading operation are transferred back to a SoC memory controller to generate the LLR values. The data transfer takes a lot of time, and causes high latency.

In one embodiment of the present invention, the LLR values can be generated according to the probability of bit patterns in different bins.

Figure 7:
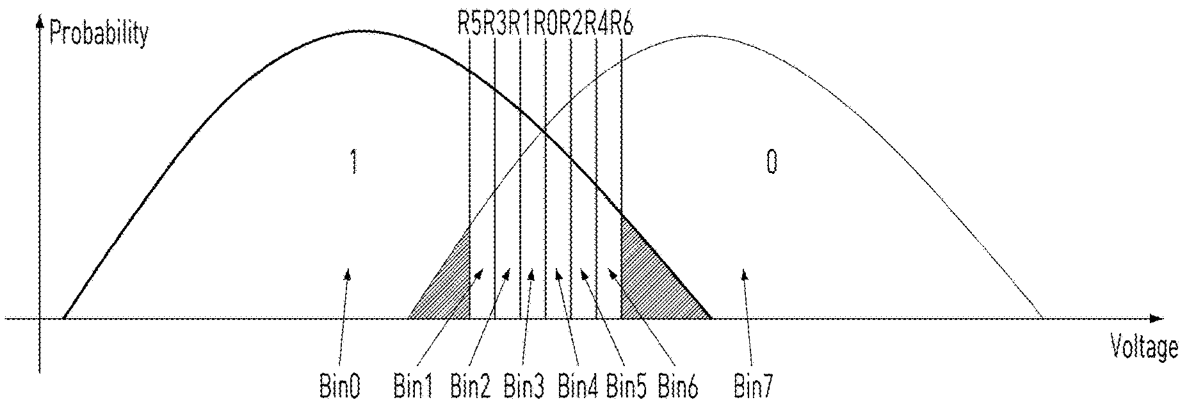
FIG. 7 is a depiction of two probability distribution curves in accordance with embodiments of the present invention.

FIG. 7 shows an example of seven reads between adjacent voltage levels, where the curves are probability density functions (PDF) of an actual threshold voltage distribution. Each cell in the NAND storage has a threshold voltage with the probability defined by the PDFs. Assume the left distribution curve corresponds to written value 1, and the right distribution curve corresponds to written value 0. The probability of writing 0 and 1 are same. There are in this example 7 read voltage thresholds, namely R0, R1, R2 . . . and R6, although the present invention is not limited to 7 read voltage thresholds. Nevertheless, 7 read voltage thresholds divide the area under curves into eight parts, namely bin0, bin1, bin2, bin3, . . . , and bin7. In one embodiment, the LLR values for different bins (or different read voltage bins) are generated according the probability of writing bits 0 or 1, and read out values, using r=bin0, bin1, . . . , bin7 or simply 0, 1, 2, . . . , 7 to represent the event, where the read result falls into each bin are represented as bin labels. Using w=0, 1 to represent the originally stored information to be 0 or 1, corresponding to the left PDF and right PDF, the LLR values of the bins are given as below:

$$LLR(\text{bin}0) = \log\frac{Pr(r = 0 \mid w = 0)}{Pr(r = 0 \mid w = 1)}$$
$$LLR(\text{bin}1) = \log\frac{Pr(r = 1 \mid w = 0)}{Pr(r = 1 \mid w = 1)}.$$
$$\vdots$$
$$LLR(\text{bin}7) = \log\frac{Pr(r = 7 \mid w = 0)}{Pr(r = 7 \mid w = 1)}$$

In one embodiment, the seven reads are done separately, where for each read voltage, all the cells from a page that fall on the left of the read threshold Rn are treated as 1 and all the cells that fall on the right of the Rn are treated as 0. Assuming each page has m cells, the result from each read is a length m binary vector of 1s and 0s, with each bit represent the result from a cell. For example, 1111111 will put the cell in bin 0. 1111101 will put the cell in bin 1.

Since in the actual drive it is not possible to measure Pr(r|w), in one embodiment, a look up table can be used to read from each read voltage bin label a LLR for each cell.

| Bin Label | LLR Value |
|---|---|
| Bin 0 | −3 |
| Bin 1 | −2 |
| Bin 2 | −1 |
| Bin 3 | 0 |
| Bin 4 | 0 |
| Bin 5 | 1 |
| Bin 6 | 2 |
| Bin 7 | 3 |

Figure 8:
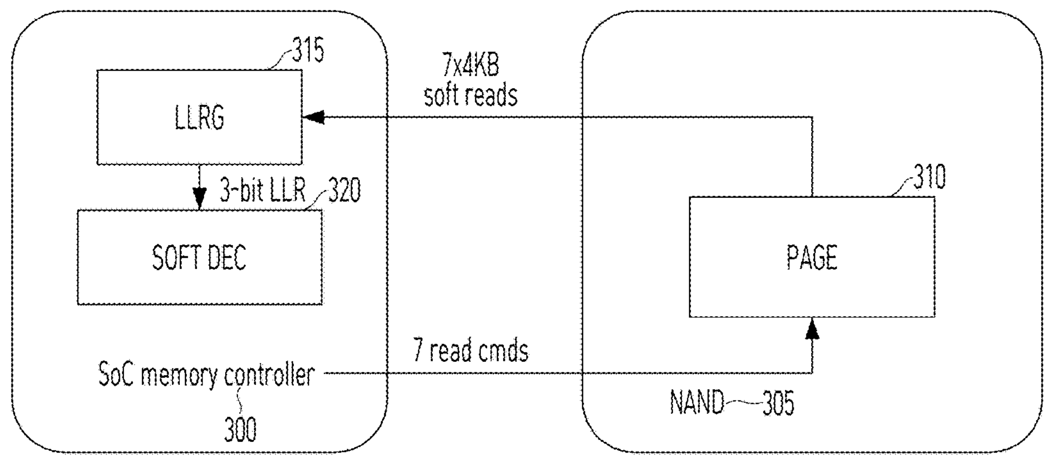
FIG. 8 is a depiction of NAND processing providing context for the present invention

To summarize, the conventional design for generating the LLR for each cell utilizes the following steps:

Referring to FIG. 8, SoC memory controller 300 (using its software or firmware) sends a command to conduct read with threshold R0. In response, the NAND 305 conducts the read from the corresponding page 310, and then transfers the resulting page having the length m binary vector back to the SoC memory controller 300.

The SoC memory controller 300 sends the command to conduct read with threshold R1. In response, the NAND 305 conducts the reads, and then transfers the resulting page of length m binary vector back to the SoC memory controller 300.

The SoC memory controller 300 sends the command to conduct reads with threshold R2. In response, the NAND 305 conducts the reads, and then transfers the resulting page of length m binary vector back to the SoC memory controller 300.

The SoC memory controller 300 sends the command to conduct reads with threshold R3. In response, the NAND 305 conducts the reads, and then transfers the resulting page of length m binary vector back to the SoC memory controller 300.

The SoC memory controller 300 sends the command to conduct reads with threshold R4. In response, the NAND 305 conducts the reads, and then transfers the resulting page of length m binary vector back to the SoC memory controller 300.

The SoC memory controller 300 sends the command to conduct reads with threshold R5. In response, the NAND 305 conducts the reads, and then transfers the resulting page of length m binary vector back to the SoC memory controller 300.

The SoC memory controller 300 sends the command to conduct read with threshold R6. In response, the NAND 305 conducts the reads, and then transfers the resulting page of length m binary vector back to the SoC memory controller 300.

The SoC memory controller 300 calculates the bin label for each cell using the 7 pages, and assigns the LLR value using the bin-label-LLR look-up table in LLRG storage 115. A decoder 320 in the SoC memory controller 300 can make error corrections using the LLR values.

Figure 9:
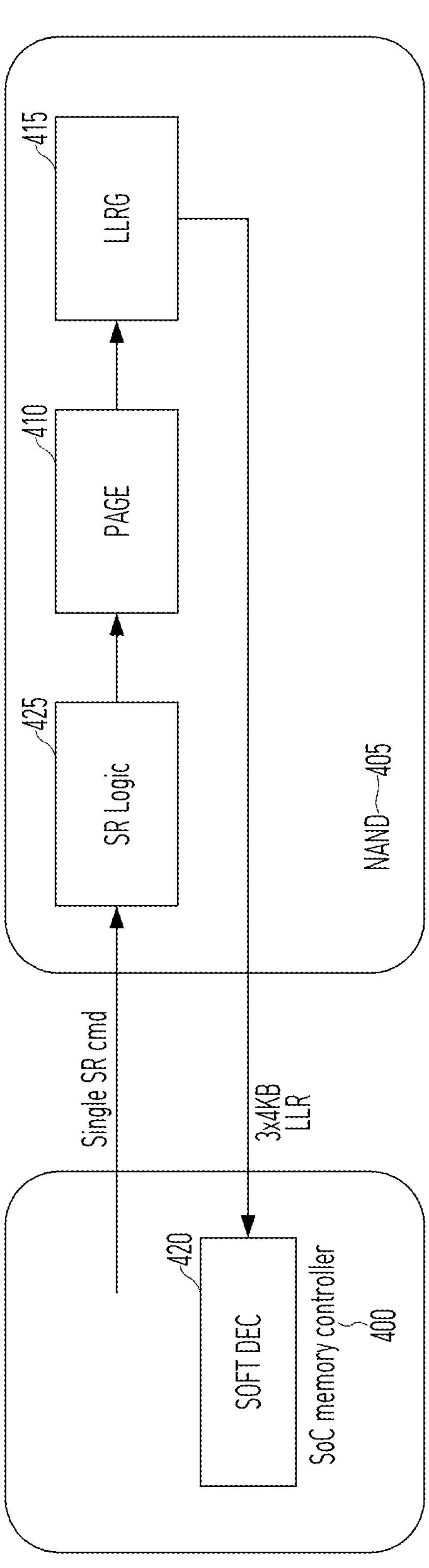
FIG. 9 is a depiction of a system for In-NAND processing accordance with embodiments of the present invention.

In the one embodiment of the present invention, as illustrated in FIG. 9, additional logic that is SR logic block 425 in the NAND 405 conducts the multiple read operations and generates the LLR values.

This In-NAND LLR generation scheme uses the following to obtain the LLR values of a page.

Referring to FIG. 9, the SoC memory controller 400 (using its software or firmware) may send a single soft read command to the NAND 405 for the LLR value generation, although the present invention is not so limited and multiple read commands could be sent.

In one embodiment, the NAND 405 calculates the LLR values internally, by reading the NAND page 410 e.g., seven times, and the in-NAND soft read (SR) logic block 425 takes in the 7×4 KB read data, and determines via a log likelihood ratio generation (LLRG) block 415 the LLR values for each bin label.

In another embodiment, the NAND 405 transfers the 3×4 KB LLR values back to the SoC memory controller 400 for decoding in decoder (e.g., soft decoder) 420.

In one embodiment, such a design permits the SoC memory controller 400 to send only one command to the NAND 405 instead of seven commands as shown in FIG. 8. In this embodiment, NAND 405 only needs to transfer 3×4 KB data back to the SoC memory controller 400, assuming each LLR value uses 3 bits, as compared to a total of 7×4 KB data from seven reads using the conventional approach.

NAND 405 may be programmed to allow a soft read command from the SoC memory controller 400 to trigger the In-NAND LLR generation, and the SR logic block 425 in NAND 405 may conduct multiple reads internally.

In one embodiment, the command sent from the SoC memory controller 400 to trigger the In-NAND LLR generation can specify the read threshold voltages R0-R6 in FIG. 7. This command can specify a particular look up table stored in the LLRG block 415 to use. This command can additionally specify which bin label to use for the LLR value in the look up table.

In one embodiment, the SR logic block 425 can orchestrate the seven reads to the NAND page 410, and the LLRG 415 can generate the LLR. The SR logic block 425 controls the process of reading the data seven times. LLR generation LLRG block 415 in NAND 405 determines the LLR value(s) using the look up table(s).

Alternatively, in one embodiment, the LLRG 415 can transfer the bin labels back to the SoC memory controller 400, and the SoC memory controller 400 can calculate the LLR values using the look up table(s).

In another embodiment, the LLRG 415 can also support multiple internal LLR lookup tables. In this case, the single soft read command sent from the SoC memory controller 400 to trigger the In-NAND LLR generation can specify the read threshold voltages R0-R6 and the LLR table to use. In another embodiment, the SR Logic block 425 can also include a LDPC syndrome weight (checksum) calculator and/or a light (or low) weight LDPC decoder. When included, the syndrome weight calculator can calculate the number of non-zero elements in the syndrome vector. When included, the light-weight LDPC decoder is a LDPC decoder having a reduced capability as compared to a fully-functional LDPC decoder in the SoC, and thus the light-weight LDPC decoder provides a limited capability of correcting errors.

In one embodiment, the syndrome weights for each of the page from the seven reads are calculated. In another embodiment, some of the reads from the 7 reads may be decodable by the low weight decoder in SR Logic 425. A fail bit count of the decoded read and a checksum may be used to select the LLR table, and in one embodiment the LLR table selection can be made through a dynamic selection where the LLR table selected changes depending on the fail bit count and/or the checksum.

Inventive LLR Generation

Figure 10:
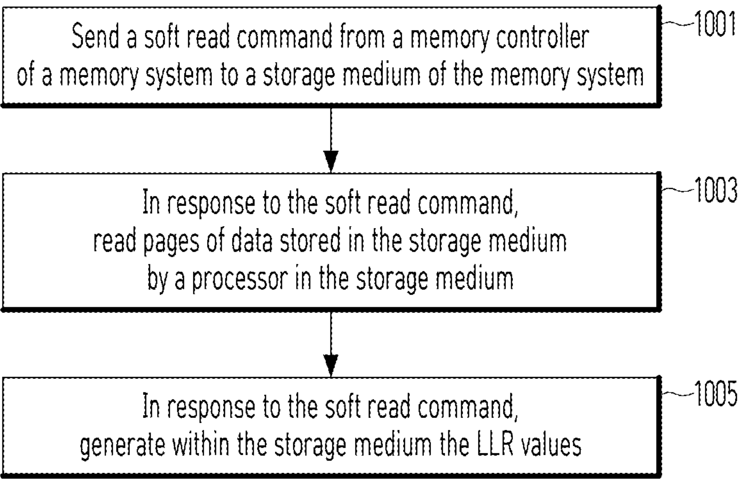
FIG. 10 is a flow chart illustrating In-NAND processing according to another embodiment of the present invention.

In one embodiment of the present invention, there is provided a method as depicted in FIG. 10. This method may be implemented in ECC unit 130 or control circuit 220 of FIG. 2 or may be implemented in LDPC decoder 510 of FIG. 5 or may be implemented in the SoC memory controller 400 and the SR Logic 425 of FIG. 9. This method at 1001 sends a (single) soft read command from a memory controller of a memory system to a storage medium of the memory system. This method at 1003, in response to the soft read command, reads pages of data stored in the storage medium by a processor in the storage medium. This method at 1005, in response to the soft read command, generates within the storage medium the LLR values.

This method may send a single soft read to a NAND device comprising the storage medium. This method may look up the LLR values in one or more look up tables containing the LLR values.

This method may associate a read voltage bin with a specific LLR value in one of the look up tables. In this method, the read voltage bin may comprise seven read voltages ranging from voltages for reading a "1" value to voltages for reading a "0" value. This method may specify in the soft read command read threshold voltages R0-R6 corresponding to the seven read voltages. This method may specify in the soft read command which one of the look up tables in the LLR generation block is used for reading the LLR values. This method may perform seven reads of the NAND, and determine the LLR values for the seven reads using the look up tables.

This method may use a decoder inside the storage medium to decode data read from the storage medium using the LLR values; and may transfer decoded data to the memory controller.

This method may use a low weight decoder inside the storage medium to decode data read from the storage medium using the LLR values.

Inventive Memory System

In another embodiment of the present invention, there is provided a memory system (such as in FIG. 3) for generation of log likelihood ratio LLR values. The memory system has a storage medium (such as for example cell array 210) having a processor therein (such as for example control circuit 220). The memory system has a memory controller (such as for example control unit 120) configured to send a (single) soft read command to the storage medium. The processor in the storage medium, in response to the soft read command, is configured to read pages of data stored in the storage medium and generate within the storage medium the LLR values.

In this memory system, the storage medium may comprise a NAND device (such as NAND 405 shown in FIG. 9), and the processor located in the NAND device may comprises a soft read SR logic block and a LLR generation block (such as SR Logic 425 and LLRG block 415 shown in FIG. 9).

In this memory system, the LLR generation block may comprise one or more look up tables containing the LLR values.

In this memory system, the one or more look up tables each associates a read voltage bin with a specific LLR value.

In this memory system, the read voltage bin comprises seven read voltages ranging from voltages for reading a "1" value to voltages for reading a "0" value.

In this memory system, the soft read command specifies read threshold voltages R0-R6 corresponding to the seven read voltages.

In this memory system, the soft read command specifies which one of the look up tables is used for reading the LLR values.

In this memory system, the SR logic block may be configured to perform seven reads of the NAND, and LLR generation block may be configured to determine the LLR values for the seven reads using the look up tables.

In this memory system, the SR logic block may comprise a decoder configured to decode data read from the storage medium using the LLR values, and decoded data is transferred to the memory controller. The decoder may comprise a low weight decoder configured to decode data read from the storage medium using the LLR values.

Although the foregoing embodiments have been described in some detail for purposes of clarity of understanding, the invention is not limited to the details provided. There are many alternative ways of implementing the invention. The disclosed embodiments are illustrative and not restrictive. The present invention is intended to embrace all modifications and alternatives of the disclosed embodiment. Furthermore, the disclosed embodiments may be combined to form additional embodiments.

Indeed, implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be excised from the combination, and the combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A memory system for generation of log likelihood ratio LLR values, the system comprising:

a storage medium having therein a processor; and a memory controller of the memory system configured to send a soft read command to the storage medium, wherein the memory controller of the memory system is coupled to the processor in the storage medium, wherein the processor in the storage medium is triggered in response to the soft read command, and thereafter, from only one soft read command from the memory controller, reads pages of data stored in the storage medium and generate within the storage medium the LLR values.

2. The memory system of claim 1, wherein the storage medium comprises a NAND device, and the processor located in the NAND device comprises a soft read SR logic block and a LLR generation block.

3. The memory system of claim 2, wherein the LLR generation block comprises one or more look up tables containing the LLR values.

4. The memory system of claim 3, wherein the one or more look up tables each associates a read voltage bin with a specific LLR value.

5. The memory system of claim 4, wherein the read voltage bin comprises seven read voltages ranging from voltages for reading a "1" value to voltages for reading a "0" value.

6. The memory system of claim 5, wherein the soft read command specifies read threshold voltages R0-R6 corresponding to the seven read voltages.

7. The memory system of claim 6, wherein the soft read command specifies which one of the look up tables in the LLR generation block is used for reading the LLR values.

8. The memory system of claim 2, wherein the SR logic block is configured to perform seven reads of the NAND, and the LLR generation block is configured to determine the LLR values for the seven reads using the look up tables.

9. The memory system of claim 2, wherein the SR logic block comprises a decoder configured to decode data read from the storage medium using the LLR values, and decoded data is transferred to the memory controller.

10. The memory system of claim 9, wherein the decoder comprises a low weight decoder configured to decode data read from the storage medium using the LLR values.

11. A method for generation of log likelihood ratio LLR values for a storage medium, comprising:

sending a soft read command from a memory controller of a memory system to the storage medium, wherein the memory controller of the memory system is coupled to a processor in the storage medium;

in response to only one soft read command from the memory controller, reading pages of data stored in the storage medium by the processor in the storage medium; and in response to the only one soft read command from the memory controller, generating within the storage medium the LLR values.

12. The method of claim 11, wherein the sending comprises sending a single soft read command to a NAND device comprising the storage medium.

13. The method of claim 12, wherein the generating comprises looking up the LLR values in one or more look up tables containing the LLR values.

14. The method of claim 13, further comprising associating a read voltage bin with a specific LLR value in one of the look up tables.

15. The method of claim 14, wherein the read voltage bin comprises seven read voltages ranging from voltages for reading a "1" value to voltages for reading a "0" value.

16. The method of claim 15, further comprising specifying in the soft read command read threshold voltages R0-R6 corresponding to the seven read voltages.

17. The method of claim 16, further comprising specifying in the soft read command which one of the look up tables is used for reading the LLR values.

18. The method of claim 17, further comprising:

performing seven reads of the NAND device, and determining the LLR values for the seven reads using the look up tables.

19. The method of claim 11, further comprising:

using a decoder inside the storage medium to decode data read from the storage medium using the LLR values; and transferring decoded data to the memory controller.

20. The method of claim 19, wherein using a decoder comprises using a low weight decoder to decode data read from the storage medium using the LLR values.

* * * * *